United States Patent [19]

Irikura et al.

[11] Patent Number: 5,386,742

[45] Date of Patent: Feb. 7, 1995

[54] TRANSAXLE ASSEMBLY HAVING AN AXLE-LOCKING MECHANISM

[75] Inventors: Koji Irikura, Kobe, Japan; Keith J. Andrews, Morristown, Tenn.

[73] Assignees: Kanzaki Kokyukoki Mfg. Co., Ltd., Amagasaki, Japan; Tuff Torq Corporation, Morristown, Tenn.

[21] Appl. No.: 96,050

[22] Filed: Jul. 22, 1993

[51] Int. Cl.[6] ............................................. F16H 57/10
[52] U.S. Cl. ............................. 74/665 F; 74/665 G; 74/665 GC; 74/411.5; 188/31
[58] Field of Search .......... 74/665 F, 665 G, 665 GC, 74/411.5; 475/5, 900; 188/31, 69, 60; 15/340.3, 340.4

[56] References Cited

U.S. PATENT DOCUMENTS

| | | | |
|---|---|---|---|
| 3,200,907 | 8/1965 | Hansen | 188/69 |
| 3,703,941 | 11/1972 | Ohie et al. | 188/69 X |
| 4,380,844 | 4/1983 | Waldhauser et al. | 15/320 |
| 4,464,948 | 8/1984 | Lindemeyer | 74/411.5 |

*Primary Examiner*—Charles A. Marmor
*Assistant Examiner*—Mary Ann Battista

[57] ABSTRACT

A transaxle assembly for small-scaled, self-propelled machines of a relatively simple structure includes an axle-locking mechanism which is housed in an axle casing (19). The locking mechanism comprises left and right rotors (47L, 47R), each having teeth (47a) thereon and mounted fixedly on left and right wheel axles (20L, 20R), and left and right locking members (49L, 49R) each having at least one pawl (49a) engageable with the teeth. The locking members are mounted on a control shaft (50), which extends parallel to the wheel axles, such that these members are moved rotationally by a rotational displacement of the control shaft so as to cause locking engagement between the pawls and teeth. A torque spring (53) is preferably employed for causing lock-operating movement of the locking member by the control shaft. The transaxle and locking mechanism can be handled as a unit in a self-propelled machine so that assembling of the machine is made easier. The locking mechanism shut off from the outside has a high reliability and durability.

20 Claims, 9 Drawing Sheets

TRANSAXLE ASSEMBLY HAVING AN AXLE-LOCKING MECHANISM

FIELD OF THE INVENTION

This invention relates to a transaxle assembly of a relatively simple structure adapted for use in a small-scaled, self-propelled machine such as a self-propelled floor-cleaning machine. More particularly, the present invention relates to a transaxle assembly having an axle-locking mechanism which is used for locking wheel axles so as to prevent a self-propelled machine from traveling when the machine is parked or in case of emergency.

BACKGROUND OF THE INVENTION

In a small-scaled, self-propelled machine such as a self-propelled floor-cleaning machine or the like, a mechanism for braking or locking a drive wheel so as to prevent the travel of the machine is generally associated with the wheel itself. For example, there is disclosed in U.S. Pat. No. 4,380,844 a self-propelled floor-cleaning machine in which a pair of left and right parking brakes adapted for use also for machine-steering purposes are associated with left and right drive wheels. The brake of each side comprises a brake drum of a large diameter, which is formed integrally with a wheel hub at an inner side of the hub, and a brake shoe which may be engaged frictionally to the outer surface of the brake drum. A single control means is provided and permits operation of the brakes of both sides at a same time. In U.S. Pat. No. 3,200,907, there is disclosed a fork lift vehicle in which a positive parking brake is associated with a drive wheel of one side. This parking brake comprises a disc which is fixedly secured to a wheel hub using bolts. The disc includes in its outer peripheral surface a plurality of teeth to which a pawl on an end of a pivotally supported pawl element may be engaged.

In a self-propelled machine having a transaxle which comprises left and right wheel axles, the structure that a parking brake is associated with requires the brake to be assembled separately from the transaxle. This will heighten, in conjunction with the fact that this kind of brake is composed of a relatively large number of parts or elements, the manufacturing cost of the machine. Further, because such parking brake is exposed to an outside of the machine at a location near to the wheel on the ground, it is subject to influences of foreign matters such as rubbish lying about on the ground or floor, especially foreign matters carried or stirred up by the rotating wheel, so that the brake has problems in operation and in durability.

Accordingly, an object of the present invention is to provide a novel transaxle assembly having an axle-locking mechanism which makes assembling of a self-propelled machine easier so as to lower the manufacturing cost of the machine. An attendant object is to provide an axle-locking mechanism of a simple structure so as to lower the manufacturing cost further.

Another object of the present invention is to provide a novel transaxle assembly for self-propelled machines in which an axle-locking mechanism is provided so as to be shut off from the outside of a self-propelled machine so that a high reliability in operation and high durability of the locking mechanism are assured.

SUMMARY OF THE INVENTION

The transaxle assembly according to the present invention comprises an axle casing (19) and co-axially disposed left and right wheel axles (20L, 20R) which are journalled in the axle casing. An axle-locking mechanism is further provided and comprises a pair of lockable left and right rotors (47L, 47R), which are disposed within the axle casing and are fixedly mounted on the left and right wheel axles, and a pair of movable left and right locking members (49L, 49R) which are supported within the axle casing and are operable to engage the pair of left and right rotors so as to prevent rotation of the rotors. The locking mechanism further comprises a control member (50) which is disposed within the axle casing and has an end extending outwardly of the casing. This control member is connected operatively to the pair of left and right locking members (49L, 49R) such that when the control member is operated both of the locking members are moved toward their lock-operating positions at a same time.

Consequently, by operating the control member (50) from an outside of the axle casing using the end of this member which extends outwardly of the casing, the movable left and right locking members (49L, 49R) can be brought to their lock-operating positions, where they operate to lock the left and right rotors (47L, 47R) non-rotatably, so that the left and right wheel axles (20L, 20R) are locked.

A disc having at its outer circumference a plurality of teeth (47a) is preferably employed as each of the rotors (47L, 47R) set forth above, and each of the locking members (49L, 49R) set forth above may preferably be supported rotatably about an axis, which extends parallel to the wheel axles, and preferably has at least one pawl (49a) which is engageable with the teeth referred to above. The plurality of teeth on each rotor will assure a quick locking operation of the axle-locking mechanism. It is believed that the combination of the teeth and pawl as well as the rotatable support of each locking member about an axis parallel to the wheel axles will provide a most reliable lock.

The control member set forth above may preferably be composed of a rotatable control shaft (50) which extends parallel to the wheel axles and has one end (50a) extending outwardly of the axle casing. The left and right locking members (49L, 49R) to be supported rotatably about an axis parallel to the wheel axles are preferably mounted on this control shaft such that the locking members are moved rotationally about the control shaft by a rotational displacement of this shaft. According to this structure, the control shaft serves as a support means for the left and right locking members and also as an operating means for these locking members. The rotatable control shaft can be supported by a simple support structure and can be extended at its one end outwardly of the axle casing without the need of a particular opening in a wall of the axle casing. Such particular opening may have a size and shape which will cause a problem of sealing.

The teeth (47a) and pawls (49a) set forth above are not always in an angular relationship of causing engagement therebetween. Further, while the teeth and pawl of one side are in such an angular relationship, the teeth and pawl of the other side are not. From this, it is desirable to provide a spring means which is operable, when the teeth and pawl are not in an engageable angular relationship, to store the lock-operating force applied to the control shaft until such an angular relationship is attained by a further slight rotation of the wheel axle and the rotor on it. In accordance with a preferred embodiment of the present invention, each of the locking members (49L, 49R) is rotatably mounted on the control shaft (50) and a spring means is disposed between each locking member and control shaft such that the locking member is moved rotationally about the control shaft through the spring means.

As such spring means, it is preferred to employ a torque spring (53) which is disposed on the control shaft. This torque spring is preferably engaged to the control shaft such that the spring is torsioned by a rotational displacement of the shaft so as to bias each locking member to move rotationally. Such torque spring may be designed such that it forces the locking member to move rotationally still in a lock-actuated condition, where the pawl (49a) is in engagement with the teeth (47a) of the rotor, so as to assure a reliable locked state of the wheel axle.

A single torque spring can be employed for both of the left and right locking members (49L, 49R) in order to reduce the number of elements for the locking mechanism. Such single spring is disposed on the control shaft such that the spring is engaged at its one and the other ends to one and the other of the left and right locking members and at its axially middle portion (53c) to the control shaft so that one and the other axial halves of the spring are torsioned at a same time by a rotational displacement of the shaft.

In a preferred embodiment of the present invention in which spring means is disposed between the control shaft (50) and respective locking members (49L, 49R), means is provided for limiting the rotational movement of each locking member relative to the control shaft to a predetermined amount. Such limiting means permits employment of a structure in that the spring means biases the locking members to move already at a non-operated condition of the control shaft so that when this shaft is operated a quick rotational movement of each locking member is attained. The limiting means set forth above also permits employment of a structure in that, when the control shaft is operated reversely so as to unlock the wheel axles, each locking member is rotationally moved away from each rotor directly by the control shaft so that a secure unlocking is attained.

In a case where a transaxle assembly to be employed in a self-propelled machine has in it a drive source, such assembly will much simplify the assembling of the machine. The present invention relates also to a transaxle assembly which has a single or a pair of motor means as such drive source. The motor means may be either of an electric type or of a hydraulic type.

In a transaxle assembly having a single motor means, the motor means (30) is fixedly mounted on the axle casing such that its motor shaft (30a) extends into the casing. A differential gearing (35) is disposed between the left and right wheel axles for an easy turn of the machine. Although traveling speed of the machine is controlled or varied by controlling or varying the motor speed, a speed-reduction gearing (40) is disposed between the motor shaft and differential gearing for avoiding the use of the motor means at its low speed range, where the motor speed is unstable, and for heightening the axle-driving torque. A pair of lockable left and right rotors (47L, 47R) of the axle-locking mechanism are fixedly mounted on the left and right wheel axles in a side-by-side relationship with a pair of left and right differential side gears (38) of the differential gearing.

In a transaxle assembly having a pair of motor means, these motor means (30L, 30R) are fixedly mounted on the axle casing such that their motor shafts (30a) extend into the casing. Because the machine may be turned by giving different speeds of rotation to the pair of motor means so as to drive the left and right wheel axles at rotational speeds different from each other, a differential gearing is not provided. A pair of speed-reduction mechanisms (40L, 40R) which may be either of a gearing type or of a chain-sprocket wheel type are disposed between the motor shafts and left and right wheel axles. A pair of lockable left and right rotors (47L, 47R) of the axle-locking mechanism are fixedly mounted on the left and right wheel axles in a side-by-side relationship with final reduction wheels (80) of the pair speed-reduction mechanisms.

In the transaxle assembly according to the present invention, members in the axle casing are arranged generally symmetrically on the left side and on the right side. From this, the axle casing can be dividedly formed, for the purpose of easy assembling of various elements into the casing, from two casing halves which are fastened together at a plane which passes between the left and right wheel axles and is perpendicular to these axles. And such left and right casing halves (19L, 19R) can be equally shaped. Equally shaped axle casings or casing halves can be commonly employed between a transaxle having a single motor means and a transaxle having a pair of motor means by forming an aperture (31) for passing a motor shaft in the side wall of each casing half and, in case of the former transaxle, by closing such aperture in the side wall of one of the casing halves with a cover member (68).

Because the tranaxle assembly according to the present invention is fashioned to have an axle-locking mechanism housed in the axle casing so as to handle the assembly as a machine unit, it enables a self-propelled machine to be assembled with ease and, therefore, reduces the manufacturing cost of the machine. This advantage is particularly remarkable in the case of the transaxle assembly having motor means in it. The axle-locking mechanism according to the present invention is fashioned such that left and right rotors (47L, 47R) are mounted on the left and right wheel axles at an inside of the axle casing as means for locking the wheel axles and these rotors which are rotated together with the wheel axles are adapted to be locked within the axle casing by the left and right locking members (49L, 49R) which are operated by a control member or shaft (50). This axle-locking mechanism is of a simple and compact structure which is comprised of a relatively small number of elements, so that the manufacturing cost of a self-propelled machine is further reduced.

The axle-locking mechanism which is housed in the axle casing according to the present invention is fully shut off from the outside of a self-propelled machine so that the locking mechanism operates in a reliable manner and has a high durability.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
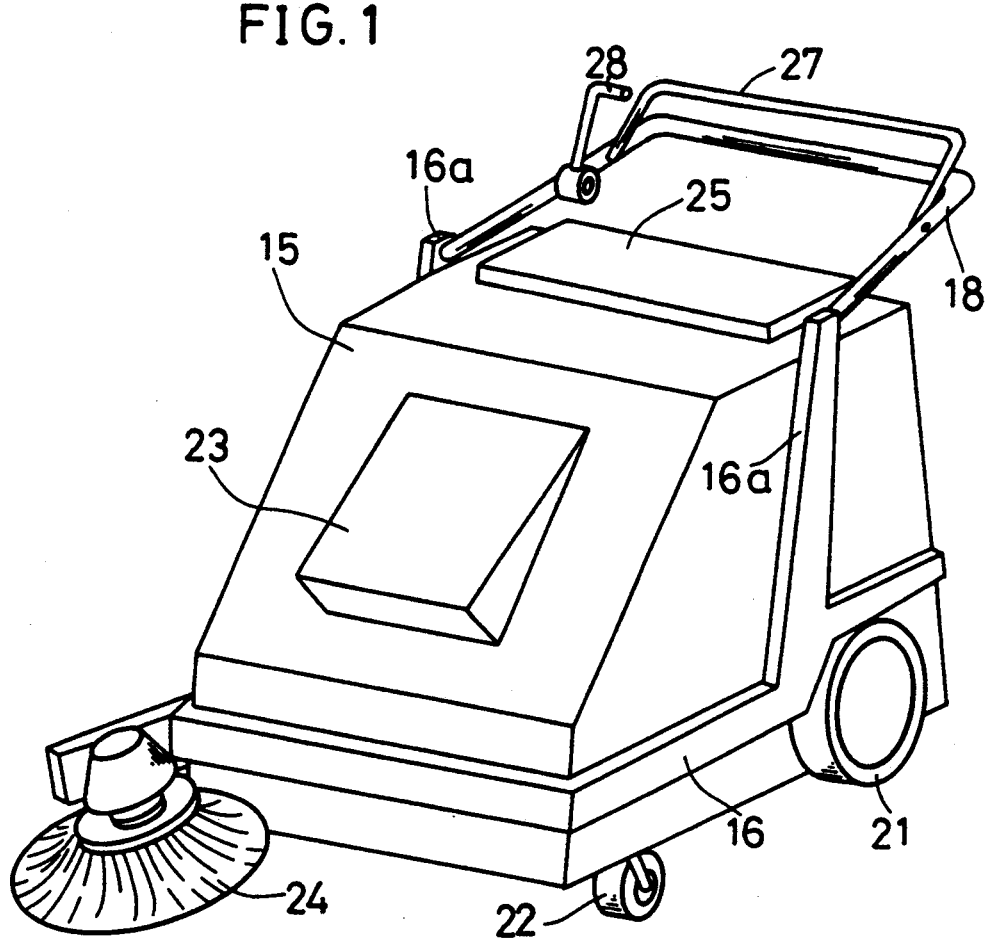
FIG. 1 is a schematic perspective view of a self-propelled floor-cleaning machine in which a first embodiment of the transaxle assembly according to the present invention is employed.
Figure 2:
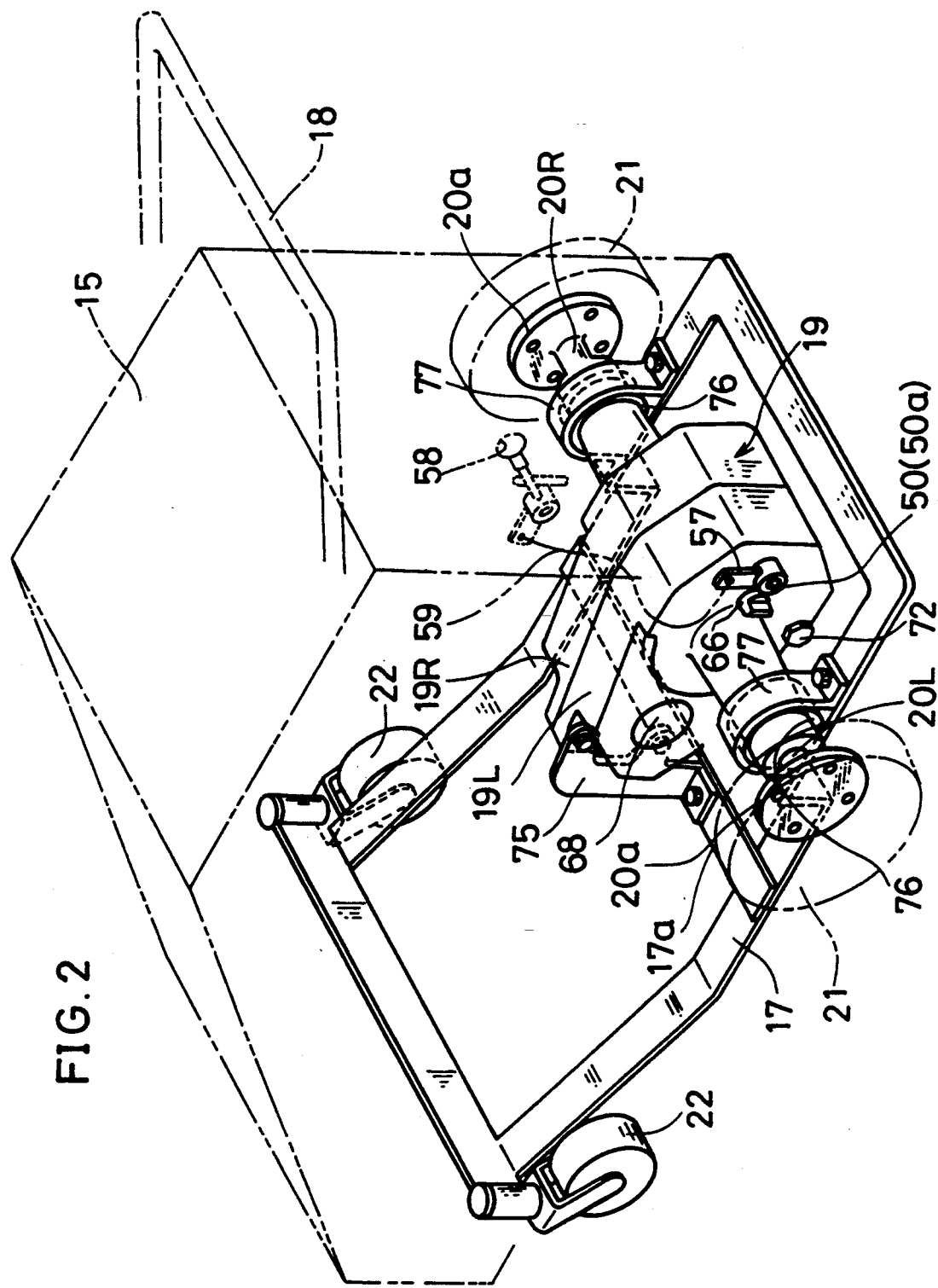
FIG. 2 is a schematic perspective view showing a part of the transaxle assembly shown in FIG. 1.

In FIG. 1, there is depicted a self-propelled floor-cleaning machine in which a first preferred embodiment of the transaxle assembly according to the present invention is employed. As shown in FIGS. 1 and 2, the cleaning machine has a body 15, a machine frame 16 which is arranged at an outer and lower portion of the body 15, and another machine frame 17 which is arranged at a lower portion of the body 15. The former frame 16 includes left and right upstanding frame portions 16a to which a handle 18 extending rearwardly of the body 15 is attached. On a rear half of the latter frame 17, a transaxle assembly having an axle casing 19 is mounted. Left and right drive wheels 21 for traveling the cleaning machine are attached to wheel discs 20a at the outer ends of left and right wheel axles 20L and 20R which extend leftwards and rightwards from the axle casing 19. Left and right swivel casters 22 are supported by the frame 17 at its front end.

As shown in FIG. 1, the body 15 includes a detachable or liftable and tiltable hopper 23. A cylindrical rotary broom (not shown) for sweeping the floor surface so as to lift debris from the floor surface toward the hopper 23 is arranged at an underside of the body 15, and a vaccum mechanism (not shown) for suctionally leading the debris into the hopper 23 in cooperation with the broom is arranged within the body 15. At one side of the front end of body 15, a rotary side brush 24 for scrubbing the floor surface is arranged. A tank (not shown) for supplying detergent or scrubbing solution to the brush may be provided within the body 15. These and other implements to be associated with the cleaning machine may be of any known structures. Examples of the known structures are disclosed in U.S. Pat. No. 4,380,844 referred to before. On an upper surface of the body 15, a control panel 25 to be equipped with manipulating means (not shown) for the various implements is arranged.

As also shown in FIG. 1, the handle 18 is provided with a clutch lever 27. As is usual, this clutch lever 27 is of the dead man type which permits the cleaning machine to travel only when the lever is grasped together with the handle. Handle 18 is further provided with a change lever 28 for controlling the traveling speed of the machine. Although a walk-behind machine is shown, it should be appreciated that the present invention can also be practiced in a riding-type machine.

Figure 3:
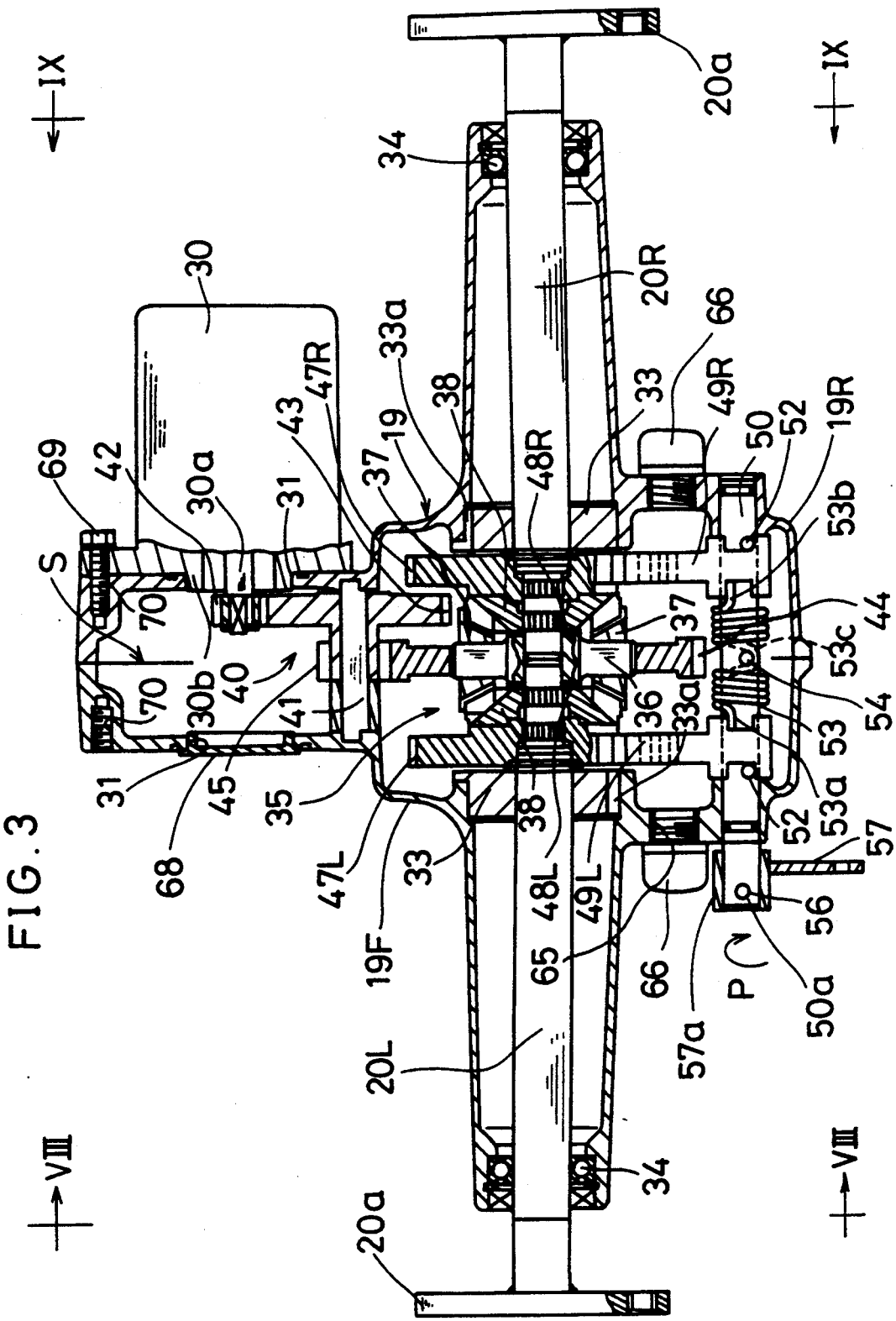
FIG. 3 is a sectional plane view of a transaxle assembly shown in FIG. 2.

As shown in FIG. 3, a motor 30 is fixedly mounted on an outer side surface of the axle casing 19. This motor may be either of the electric type or of the hydraulic type, but the motor 30 shown is of the electric type. The motor 30 serves as a drive source for traveling the cleaning machine and is mounted on the axle casing 19 such that an annular projection 30b on the motor casing is fitted in an aperture 31 in a side wall of the axle casing 19 so that its motor shaft 30a extends into the casing 19 through the aperture 31. The clutch lever 27 shown in FIG. 1 is adapted to turn on, when it is grasped, an electric source switch (not shown) for the motor 30, and the change lever 28 shown also in FIG. 1 is adapted to manipulate a potentiometer (not shown) for changing the speed of motor 30.

As also shown in FIG. 3, the axle casing 19 is provided with integral left and right axle housing portions. The left and right wheel axles 20L and 20R are rotatably supported by the axle casing 19 at their inner sides through left and right annular bearing members 33 having lubricant passage grooves 33a and at their outer sides through left and right ball bearings 34 which are arranged at outer end portions of the axle housing portions. At an inner side of the left and right bearing members 33, a differential gearing 35 is disposed between the left and right wheel axles 20L and 20R for providing a required difference in rotational speed between these axles when the cleaning machine is turned. As is usual, this differential gearing 35 comprises a pair of differential pinions 37, which are mounted on a pinion shaft 36, and a pair of differential side gears 38 which are mounted on the left and right wheel axles fixedly by spline fitting. These pinions 37 and gears 38 are meshed with one another as shown.

As shown in FIG. 3, it is fashioned that power is transmitted from the motor shaft 30a to the differential gearing 35 through a speed-reduction mechanism 40. That is, a support shaft 41 extending parallel to the motor shaft and wheel axles is disposed between the motor shaft 30a and differential gearing 35 and is supported at its both ends non-rotatably by the axle casing 19. On this support shaft 41, integrally formed larger and smaller gears 43 and 45 are rotatably mounted. The larger gear 43 meshes with a small gear 42 which is fixedly mounted on the motor shaft 30a, whereas the smaller gear 45 meshes with a large input gear 44 of the differential gearing 35.

Figure 4:
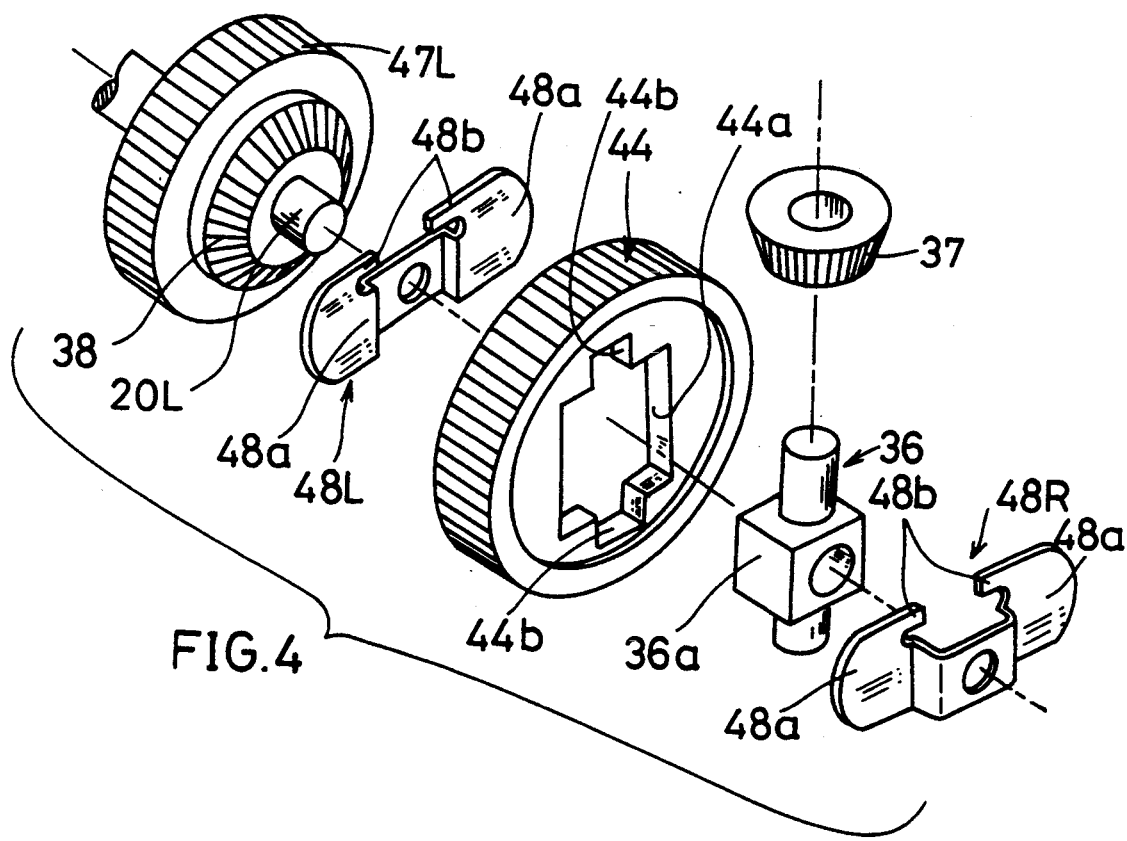
FIG. 4 is a perspective view showing several elements of a differential gearing and rotor shown in FIG. 3.

As also shown in FIG. 3, lockable left and right disc-shaped rotors 47L and 47R are disposed between the left and right differential side gears 38 and bearing members 33 and are fixedly mounted on the left and right wheel axles 20L and 20R by spline fitting. As shown in FIGS. 3 and 4, the input gear 44 includes in its boss portion a rectangular opening 44a having a pair of opposed recesses 44b in which both ends of the pinion shaft 36 are inserted. The pinion shaft 36 is shaped to have a rectangular middle portion 36a to be inserted in the opening 44a of the input gear 44. A pair of left and right retainer members 48L and 48R of a sheet metal material are provided and are adapted to abut on the shaft middle portion 36a from the side of respective differential side gears 38 so as to prevent the pinion shaft 36 from moving toward the respective side gears 38. Each of these retainer members 48L and 48R has a pair of wings 48a, which are adapted to abut on a side surface of the boss portion of input gear 44 so as to prevent this gear from moving sidewards, and a pair of projections 48b which are adapted to sandwich the rectangular middle portion 36a of pinion shaft 36 at an outside of the gear opening 44a so as to prevent the pinion shaft from tilting. In the assembled state shown in FIG. 3, the retainer members 48L and 48R are kept in position by the differential side gears 38 and rotors 47L, 47R which are mounted in a side-by-side relationship on the respective wheel axles and are kept from moving toward the bearing members 33 by retainer rings on the wheel axles.

Figure 5:
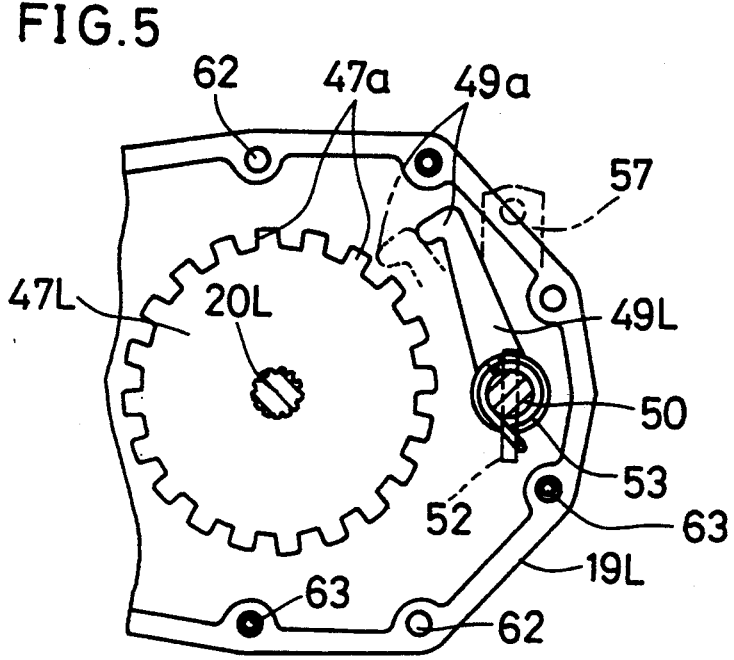
FIG. 5 is a sectional side view showing a part of an axle-locking mechanism shown in FIG. 3.
Figure 6:
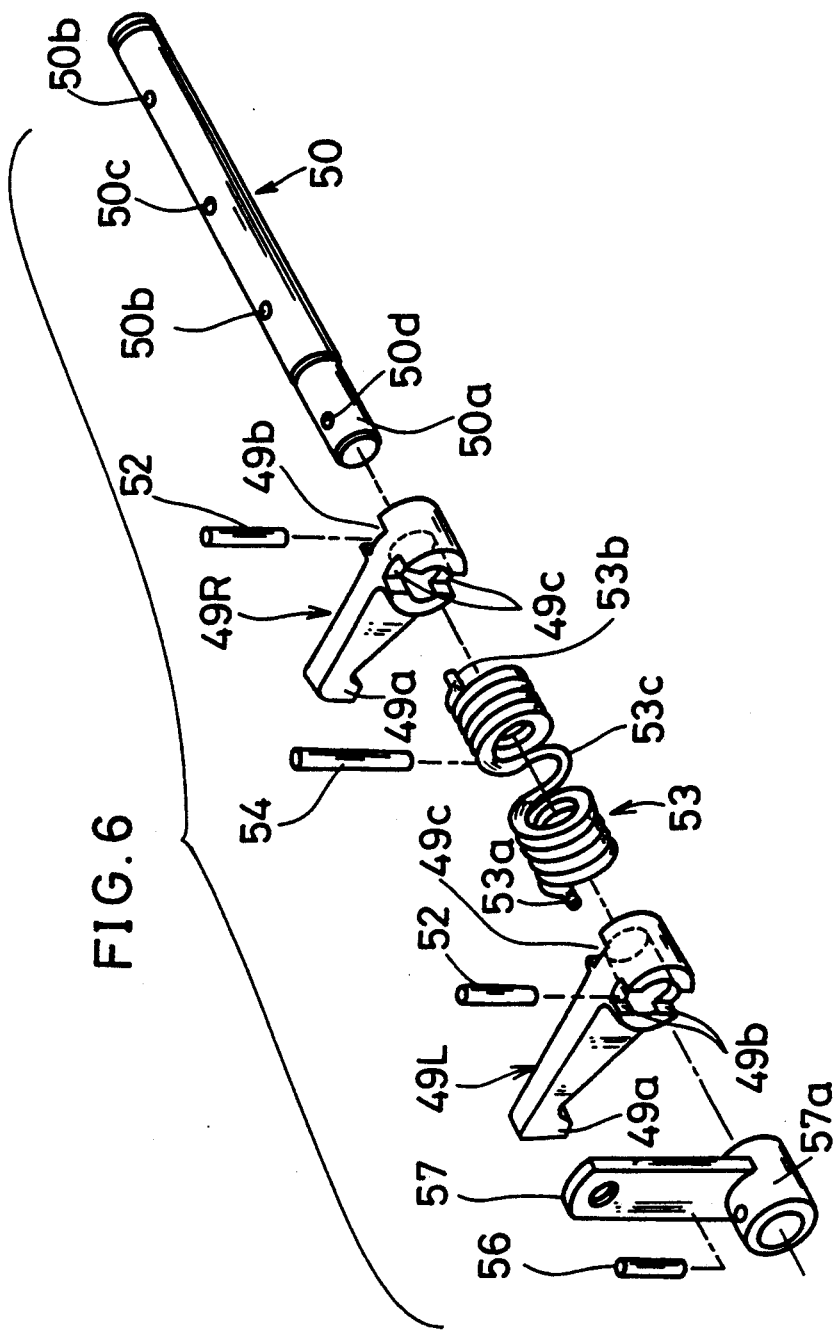
FIG. 6 is a perspective view showing various elements of the axle-locking mechanism shown in FIG. 3.

As shown in FIGS. 3 to 5, each of the rotors 47L and 47R has at its outer peripheral surface a plurarity of teeth 47a. As shown in FIGS. 3 and 5, a control shaft 50 which extends parallel to the wheel axles 20L and 20R is disposed in the axle casing 19 and is supported rotatably at both ends of it by the casing 19. A pair of left and right locking members 49L and 49R are rotatably mounted at their base end boss portions on the control shaft 50 and are adapted to be moved rotationally about the control shaft by a rotational displacement of this shaft 50. As shown in FIGS. 5 and 6, each of these left and right locking members has at its free end at least one pawl 49a which is engaged, when the locking members 47L and 47R are moved rotationally by a rotational displacement of the control shaft 50 toward arrow P shown in FIG. 3, to the teeth 47a of rotor 47 of that side. One end 50a of the control shaft 50 extends outwardly of the axle casing 19, as shown in FIGS. 2 and 3.

As shown in FIGS. 3 and 6, the boss portion of each locking member 49L, 49R at which this member is rotatably mounted on the control shaft 50 includes at its one and the other end faces a pair of angularly lengthy recesses 49b and 49c. Left and right pins 52 which are press-fitted in radial bores 50b formed in the control shaft 50 are inserted in the recesses 49b of the left and right locking members 49L and 49R so that the rotational movement of each locking member relative to the control shaft 50 is limited to an amount which is determined by the angular length of recess 49b. Between the left and right locking members 49L and 49R, a torque spring 53 is disposed on the control shaft 50 and has one and the other ends 53a and 53b which extend into the recesses 49c of the left and right locking members and engage to these members 49L and 49R. The torque spring 53 includes at its axially middle portion a loop 53c, and the control shaft 50 includes another radial bore 50c disposed between the bores 50b. A pin 54 press-fitted in the bore 50c and passes through the spring loop 53c such that when the control shaft 50 is rotated toward arrow P shown in FIG. 3 the loop 53c is displaced toward the same direction by the pin 54. By such displacement of the loop 53c, the torque spring 53 is torsioned.

As also shown in FIGS. 3 and 6, the end 50a of control shaft 50 includes a radial bore 50d. A control arm 57 is attached at its boss portion 57a to the shaft end 50a using a pin 56 which is press-fitted in the bore 50d. As shown in FIG. 2, the control arm 57 is connected to a control lever 58, which is arranged at an underside of the handle 18, through a push-pull control cable 59.

Figure 7A:
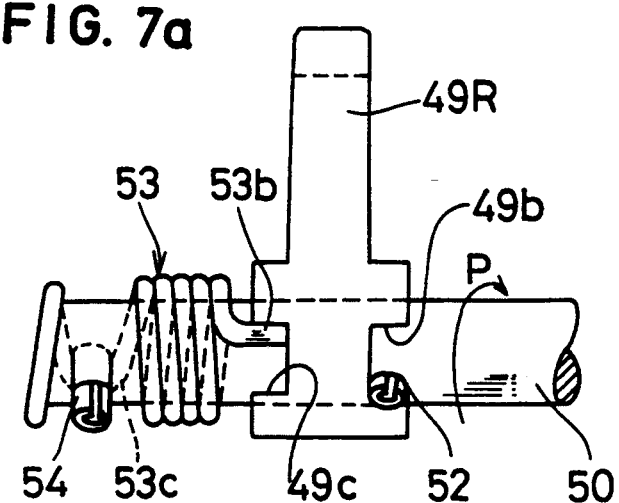
FIG. 7 (a), (b) and (c) are plane views showing a part of the axle-locking mechanism in three different conditions.

FIG. 7 illustrates three states with respect to the locking member 49R of one side. As shown in this figure, split pins are employed actually as pins 52 and 54 referred to above. FIG. 7(a) illustrates an unlocking state of the locking member 49R where the control shaft 50 has not been given any rotation toward arrow P. In this state, the spring end 53b engages to one end face of the recess 49c from the direction of arrow P so as to bias the locking member 49R to move toward arrow P, and the rotational movement of this member 49R is prevented by an engagement of the pin 52 to one end face of the recess 49b from the reverse direction of arrow P. When the control lever 58 shown in FIG. 2 is operated so as to provide a rotational displacement toward arrow P to the control shaft 50 through the cable 59 and through the control arm 57, the loop 53c of torque spring 53 is displaced by the pin 54 also toward arrow P so that each axial half of the torque spring 53 tends to be torsioned.

Figure 7B:
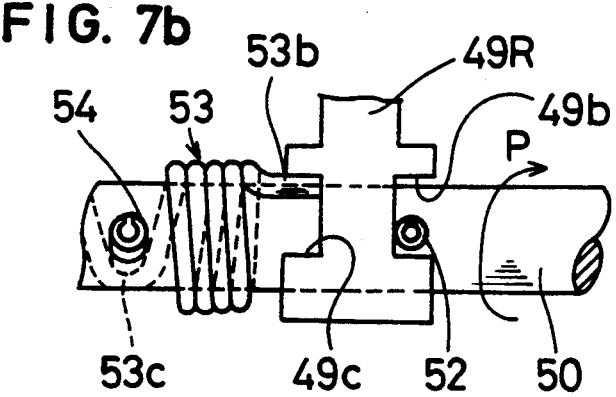

In a condition where the pawl 49a can enter a groove between two teeth 47a of the rotor as shown in phantom in FIG. 5 with respect to the locking member 49L, the pawl 49a is engaged to the teeth 47a at once. This engaged condition is illustrated in FIG. 7(b). It is designed that, while the locking member is prevented from moving toward arrow P when the pawl 49a thereon has reached the bottom of groove between two teeth 47a of the rotor, the control shaft 50 is further displaced rotationally toward arrow P by some degree so that the pin 52 is moved away from the end face of recess 49b so as to disengage from the locking member, as shown in FIG. 7(b). Consequently, the locking member is still biased by the torque spring 53 to move toward arrow P at the condition shown in FIG. 7(b).

Figure 7C:
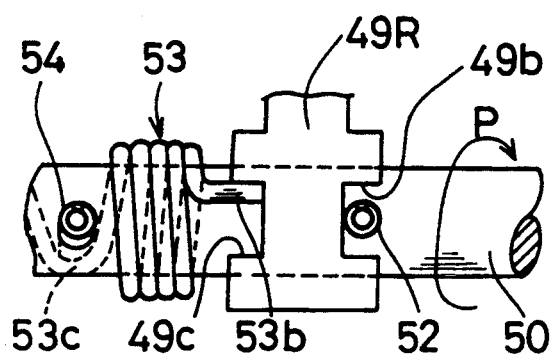

In a case where the pawl 49a has once come into contact with the crest of one of the teeth 47b so that the rotational movement of the locking member has once been prevented, only the control shaft 50 is displaced rotationally toward arrow P, as illustrated in FIG. 7(c), so that the torque spring 53 is much torsioned and, therefore, the biasing force of it is enlarged. Then, as soon as a condition where the pawl 49a can enter a groove between two teeth 47a has been attained by an additional slight rotation of the rotor 47L or 47R, the locking member 49L or 49R is additionally moved toward arrow P so that the condition shown in FIG. 7(b) is attained.

When the control shaft 50 is displaced rotationally toward the reverse direction of arrow P from the condition shown in FIG. 7(b) using the control lever 58 shown in FIG. 2, the locking member 49R is moved by the pin 52, as from the time when this pin has been in contact with the locking member at one end face of the recess 49b from the reverse direction of arrow P, toward that direction. The end 53b of torque spring 53 is pushed and displaced toward the reverse direction of arrow P by the locking member 49R so that the torque spring 53 is displaced along a circumferential direction of the control shaft 50 so as to keep engagement of the loop 53c to the pin 54.

The pair of recesses 49b and 49c of each locking member 49L, 49R are open sidewards of the locking member so that these recesses can be formed with ease when the locking member is formed by casting. Because these recesses 49b and 49c are equally shaped, equally shaped two locking members can be used as left and right locking members 49L and 49R by alternatively employing one of the recesses as recess 49b and the other of the recesses as recess 49c. Torque spring 53 may be secured to the control shaft 50 by providing, in place of the loop 53c shown, an axially middle coiled portion defining a circular bore into which the pin is to be inserted. The torque spring 53 shown can be prepared simply by spreading a portion of a coil spring on the market so as to form the loop 53c.

Figure 8:
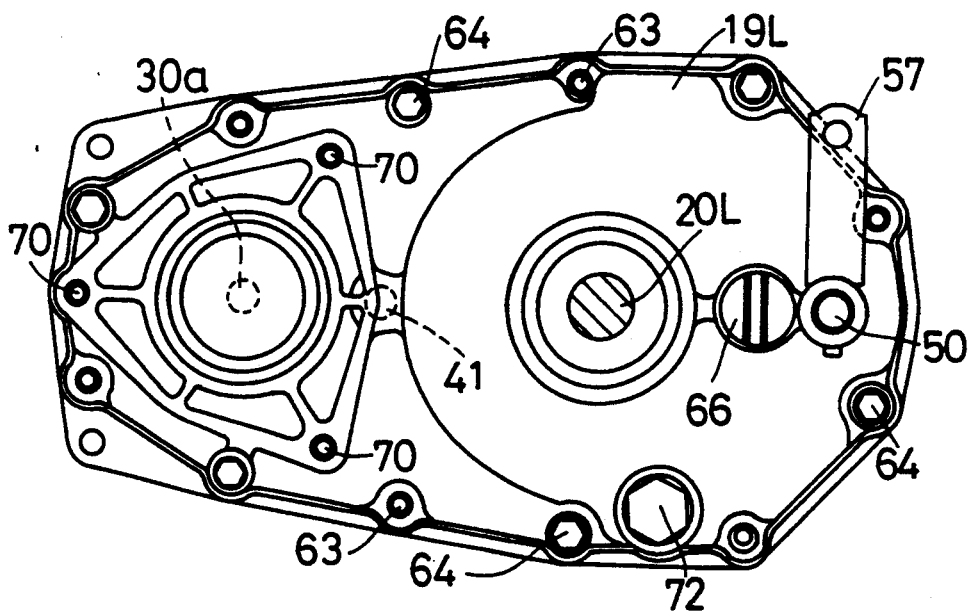
FIG. 8 is a sectional side view taken along line VIII—VIII of FIG. 3.
Figure 9:
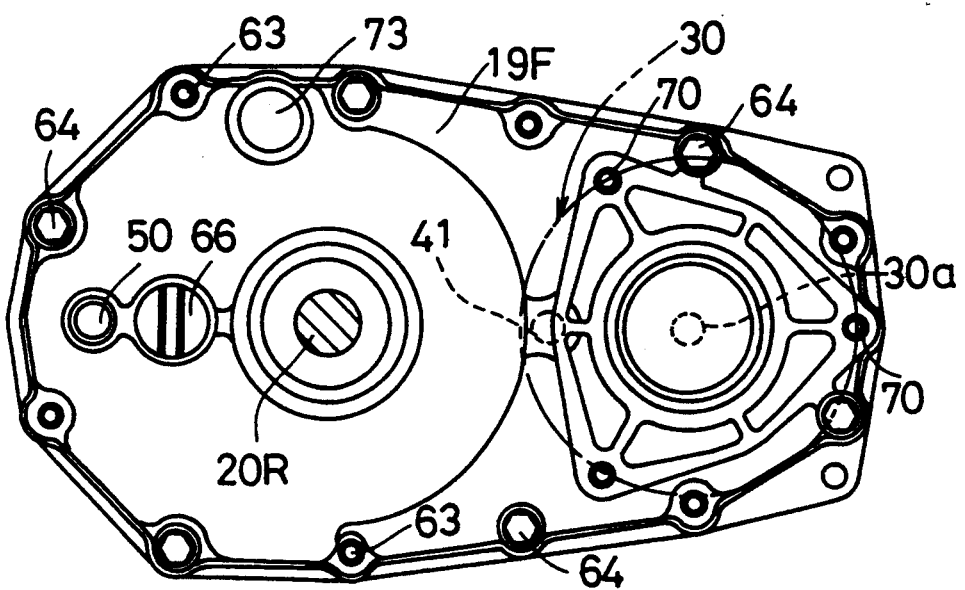
FIG. 9 is a sectional side view taken along line IX—IX of FIG. 3.

As shown in FIGS. 2 and 3, the axle casing 19 is composed of left and right casing haves 19L and 19R which are fastened together. Left and right views of the axle casing 19 are depicted in FIGS. 8 and 9. As can be seen from FIG. 3 and from FIGS. 8 and 9, both of the casing halves 19L and 19R are equally shaped. That is, a vertical plane S which passes between the left and right wheel axles 20L and 20R and is perpendicular to these wheel axles is employed as the joint plane between the casing halves 19L and 19R. Non-threaded bores 62 and threaded bores 63 are formed at the peripheral edge potion of each casing half, as shown in FIG. 5 with respect to the casing half 19L, alternately along the peripheral direction of each casing half and, as shown in FIGS. 8 and 9, the left and right casing halves are fastened together using bolts 64 which extend through non-threaded bores 62 of one of the casing halves and are threadingly fitted in threaded bores 63 of the other casing half. Axes of the wheel axles 20L, 20R, motor shaft 30a, support 41 and control shaft 50 are positioned on a horizontal plane which extend across the axle casing 19 at a vertically middle level of the casing. An oil-filling bore 65 having its center axis also on the horizontal plane set forth above is formed in each of the casing halves 19L and 19R and is closed using a removable oil plug 66 so that the casing 19 can be fed with lubricant oil from either side of this casing.

Figure 10:
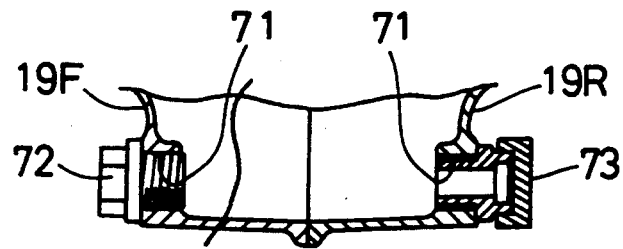
FIG. 10 is a sectional view showing a part of an axle casing shown in FIG. 3.

As shown in FIG. 3, an aperture 31 equal to the aforementioned aperture 31 for passing the motor shaft 30a is formed also in a side wall of the left casing half 19L and is closed using an elastomeric or resilient cover 68. Threaded bores 70 for bolts 69 for attaching the motor 30 are equally formed also in the left casing half 19L and remain idle. A pair of grooves for fitting respective ends of the support shaft 41 non-rotatably are equally formed in inner walls of the casing halves 19L and 19R. A pair of through bores for rotatably receiving one and the other end portions of the control shaft 50 are also equally formed in the side walls of the casing halves and such bore of the right casing half 19R is closed by the control shaft 50 itself. A pair of threaded bores 71 shown in FIG. 10 are equally formed in the side walls of both casing halves such that, in the assembled condition, the bore 71 of the left casing half 19L is positioned at a lower level and the bore 71 of the right casing half 19R is positioned at a higher level. As shown in FIGS. 8 to 10, an oil drain plug 72 is threadingly fitted in the bore 71 of the lower level, whereas a breather plug 73 is threadingly fitted in the bore 71 of the higher level.

By forming the left and right casing halves 19L and 19R equally as having been detailed hereinbefore, the manufacturing cost of the axle casing 19 and, therefore, of the transaxle assembly is much reduced. The axle casing 19 shown is further designed such that it can be used also for the one in a transaxle assembly having a pair of motor means for further enhancing the economy, as will be detailed later. As shown in FIG. 2, the axle casing 19 is supported at its front end by an upstanding stay 75 on a cross member 17a of the machine frame 17 and at its rearer side by a pair of clamping bands 77 of a sheet metal material which clamp the left and right axle housing portions to the machine frame 17 through elastomer rings 76.

The floor-cleaning machine shown in FIG. 1 is used for cleaning various surfaces including indoor floor surfaces, outdoor road surfaces and parking lots in a condition such that an operator behind the machine is grasping the clutch lever 27 together with handle 18 so as to travel the machine. The traveling speed of machine may be changed non-stepwisely by changing the position of the change lever 28. The machine is steered or turned by shifting the direction of the machine by means of handle 18 and turning of the machine is attained with ease owing to operation of the differential gearing 35 shown in FIG. 3. When the machine is to be retreated, the operator removes his or her hands from the clutch lever 27 so as to interrupt driving of the machine and pulls the handle 18 so as to retreat the machine. In addition, by employing a reversible motor as the motor 30, an automatical backward motion of the machine can also be achieved. When the machine is to be parked or when an emergency is encountered, the operator is to remove his or her hands from the clutch lever 27 and then to operate the control lever 58 shown in FIG. 2. In such a case, the left and right rotors 47L and 47R and, therefore, left and right wheel axles 20L and 20R are locked non-rotatably by the left and right locking members 49L and 49R so that a secure and safe stopped condition of the machine is attained.

Figure 11:
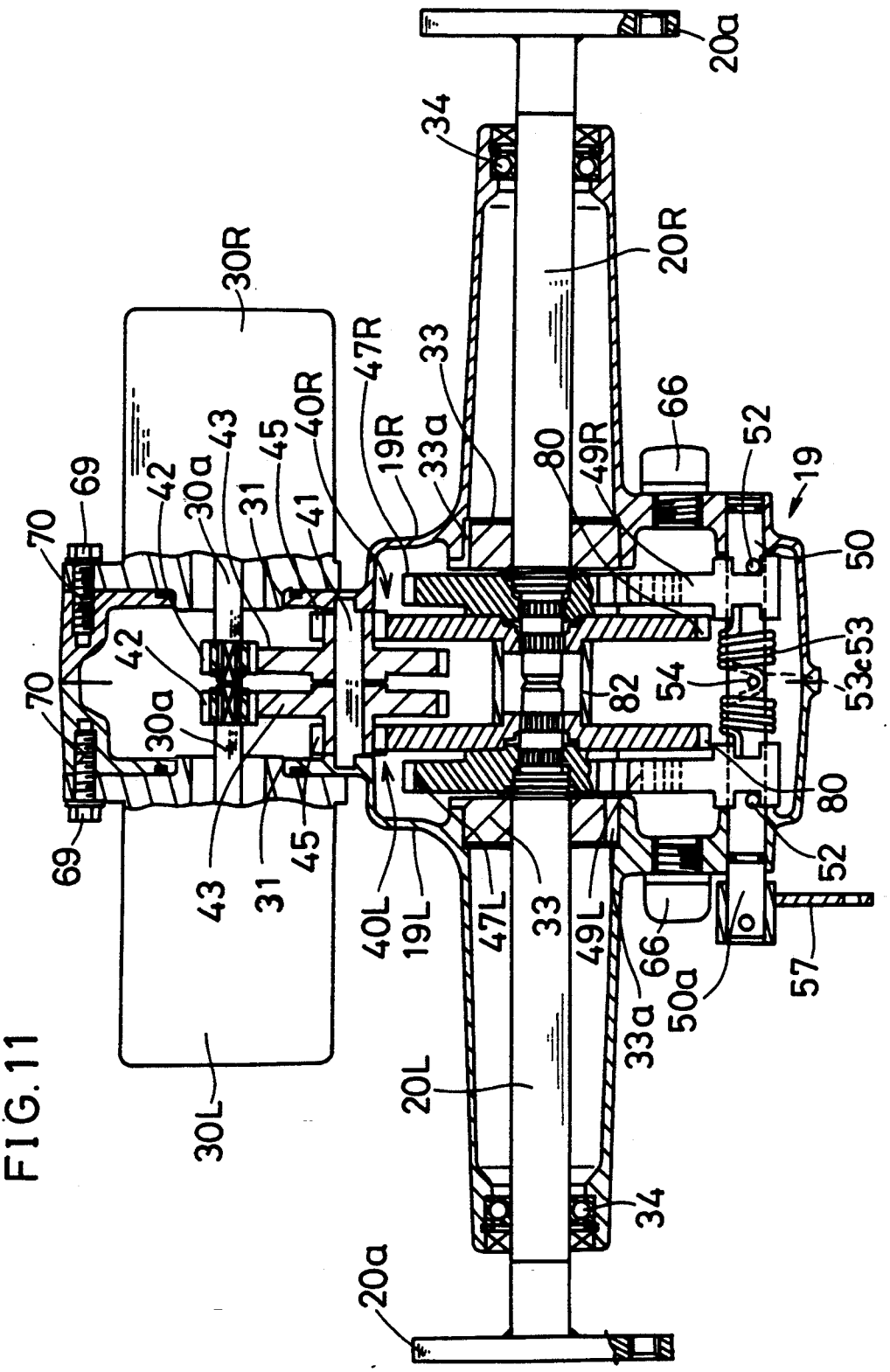
FIG. 11 is a sectional plane view similar to FIG. 3 but showing a second embodiment of the transaxle assembly according to the present invention.
Figure 12:
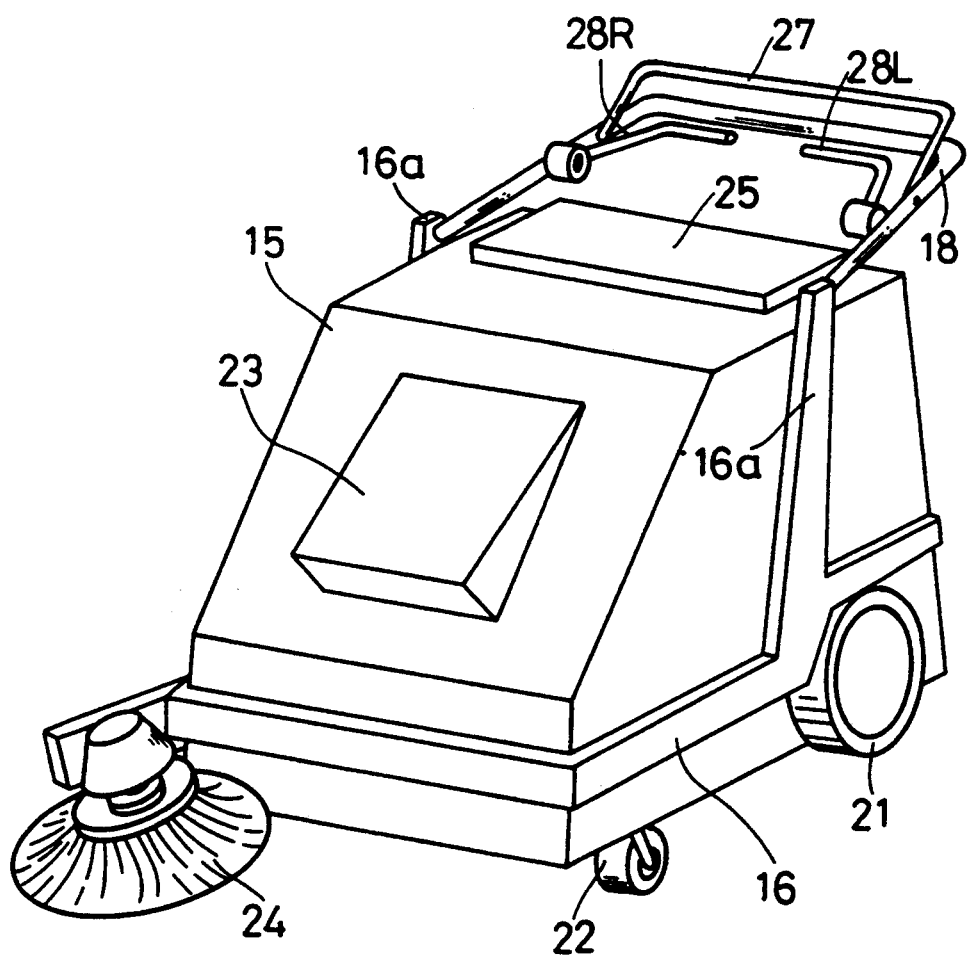
FIG. 12 is a schematic perspective view of a self-propelled floor-cleaning machine in which the transaxle assembly shown in FIG. 11 is employed.

FIG. 11 illustrates a second preferred embodiment of the transaxle assembly according to the present invention, and FIG. 12 illustrates a self-propelled floor-cleaning machine in which the second embodiment is employed. In this embodiment, a pair of motors 30L and 30R are employed, as shown in FIG. 11, for driving the left and right wheel axles 20L and 20R individually. From this, the handle 18 is provided with a pair of left and right change levers 28L and 28R, as shown in FIG. 12, so that an operator can change the rotational speed of respective motors 30L, 30R individually.

As shown in FIG. 11, an axle casing 19 composed of left and right casing halves 19L and 19R is employed here again and this casing 19 is identical with the one employed in the first embodiment. The pair of motors 30L and 30R are fixedly mounted on the side walls of the pair of casing halves 19L and 19R by using the apertures 31 and threaded bores 70 in these side walls. Because the machine may be turned by giving different speeds of rotation to the pair of motors 30L and 30R, a differential gearing is not provided between the left and right wheel axles 20L and 20R. And, left and right speed-reduction mechanisms 40L and 40R are disposed between the left and right motor shafts 30a, which extend into the axle casing 19, and left and right wheel axles 20L and 20R.

That is, as also shown in FIG. 11, two sets of integral larger and smaller gears 43 and 45 are rotatably mounted on a support shaft 41 which is identical with the one employed in the first embodiment. The larger gears 43 mesh with small gears 42 which are fixedly mounted on the left and right motor shafts 30a. The smaller gears 45 mesh with large gears 80 which are fixedly mounted on the left and right wheel axles 20L and 20R by spline-fitting. The speed-reduction gearings 40L, 40R shown can be replaced simply by speed-reduction mechanisms of the chain-sprocket wheel type.

Equally shaped left and right wheel axles 20L and 20R are also identical with the ones employed in the first embodiment. For providing a lateral space which corresponds to the lateral width of the differential gearing 35 employed in the first embodiment, a spacer sleeve 82 is disposed between the left and right reduction gears 80 on the left and right wheel axles. Bearings 33 and 34 for receiving the wheel axles are also identical with the ones employed in the first embodiment.

In such a transaxle assembly, an axle-locking mechanism is employed and comprises elements such as rotors 47L, 47R, locking members 49L, 49R, control shaft 50 and torque spring 53 which are all identical with the ones employed in the first embodiment and are arranged similarly as in the first embodiment. Consequently, the locking mechanism employed in the second embodiment operates in a manner similar to that of the locking mechanism according to the first embodiment.

In FIGS. 11 and 12, parts designated by numerals the same as those in FIGS. 1 and 3 are identical with the corresponding parts of the first embodiment. Parts of the second embodiment which are omitted from the drawings are also identical with the corresponding parts of the first embodiment. Consequently, while both of the transaxle assemblies having a single motor and having two motors are demanded in the market, various elements including axle casings 19 are made common to these two kinds of transaxle assemblies so that economy is increasingly heightened.

The floor-cleaning machine shown in FIG. 12 is used similarly to the machine shown in FIG. 1 except that the machine is steered or turned by giving different speeds of rotation to the left and right wheel axles 20L and 20R by controlling the left and right change levers 28L and 28R individually.

While the present invention has been described in connection with transaxle assemblies for self-propelled floor-cleaning machines of the walk-behind type, the invention can also be practiced as transaxle assemblies for other self-propelled machines including both of the walk-behind units and riding units. Also, the present invention can be practiced by applying numerous changes and modifications to the structures of the embodiments shown as occasion demands. Accordingly, the present invention is by no means limited by the embodiments shown but is to be limited only by the fair meaning of the appended claims.

We claim:

1. A transaxle assembly comprising:
   an axle casing (19);
   co-axially disposed left and right wheel axles (20L, 20R) which are journalled in said axle casing (19);
   a pair of lockable left and right rotors (47L, 47R) which are disposed within said axle casing (19) and are fixedly mounted on said left and right wheel axles (20L, 20R);
   a pair of movable left and right locking members (49L, 49R) which are supported within said axle casing (19) and are operable to engage said pair of left and right rotors (47L, 47R) so as to prevent rotation of said rotors; and
   a control member (50) which is disposed within said axle casing (19) and is connected operatively to said pair of left and right locking members (49L, 49R) such that when said control member is operated both of said locking members are moved toward their lock-operating positions at a same time, one end (50a) of said control member extending outwardly of said axle casing.

2. The transaxle assembly as set forth in claim 1, wherein each of said pair of rotors (47L, 47R) is disc-shaped and includes at its outer circumference a plurality of teeth (47a) and wherein each of said pair of locking members (49L, 49R) is supported rotatably about an axis parallel to said wheel axles (20L, 20R) and has one end including at least one pawl (49a) which is engageable with said teeth (47a).

3. The transaxle assembly as set forth in claim 2, wherein said control member is composed of a rotatable control shaft (50) which extends parallel to said wheel axles (20L, 20R) and has one end (50a) extending outwardly of said axle casing (19), said pair of locking members (49L, 49R) being mounted on said control shaft such that said locking members are moved rotationally about said control shaft by a rotational displacement of said shaft.

4. The transaxle assembly as set forth in claim 3, wherein each of said pair of locking members (49L, 49R) is mounted on said control shaft (50) such that said each locking member is rotationally movable relative to said control shaft, said control shaft being operable to move said each locking member rotationally about said shaft through a spring means (53) which is disposed between said control shaft and said each locking member.

5. The transaxle assembly as set forth in claim 4, wherein said spring means is composed of a torque spring (53) which is disposed on said control shaft (50) and has one end (53a; 53b) engaged to said each locking member from a direction of causing a lock-operating rotational movement of said locking member, said torque spring being engaged at the other end (53c) of it to said control shaft such that said spring is torsioned by a rotational displacement of said shaft so as to provide a lock-operating rotational movement of said locking member.

6. The transaxle assembly as set forth in claim 5, wherein a single spring element (53) is provided as said torque spring for said pair of locking members (49L, 49R) and is engaged at its one and the other axial ends (53a, 53b) to one and the other of said locking members, said spring element being engaged at its axially middle portion (53c) to said control shaft (50) such that one and the other axial halves of said spring element are torsioned at a same time by a rotational displacement of said control shaft (50).

7. The transaxle assembly as set forth in any one of claims 4, 5 or 6, wherein means (49b, 52) which is adapted to limit the rotational movement of each of said locking members (49L, 49R) relative to said control shaft (50) to a predetermined amount is disposed between said each locking member and said control shaft.

8. A transaxle assembly comprising:
   an axle casing (19);
   a motor means (30) fixedly mounted on said axle casing (19) and having a motor shaft (30a) which extends into said axle casing;
   co-axially disposed left and right wheel axles (20L, 20R) which are journalled in said axle casing (19);
   a differential gearing (35) disposed between said left and right wheel axles (20L, 20R) and including left and right differential side gears (38) which are fixedly mounted on said left and right wheel axles;
   a speed-reduction gearing (40) disposed between said motor shaft (30a) and said differential gearing (35);
   lockable left and right rotors (47L, 47R) fixedly mounted on said left and right wheel axles (20L, 20R) in a side-by-side relationship with said left and right differential side gears (38);

movable left and right locking members (49L, 49R) which are supported within said axle casing (19) and are operable to engage said left and right rotors (47L, 47R) so as to lock said rotors non-rotatably; and a control member (50) disposed within said axle casing (19) and connected operatively to said left and right locking members (49L, 49R) for moving both of said locking members to their lock-operating positions at a same time, one end (50a) of said control member extending outwardly of said axle casing.

9. The transaxle assembly as set forth in claim 8, wherein said control member (50) is connected operatively to said left and right locking members (47L, 47R) through a spring means (53) which is operable to bias said locking members, when said control member is operated, to move toward their lock-operating positions.

10. The transaxle assembly as set forth in claim 9, wherein said control member is composed of a rotatable control shaft (50) which extends parallel to said wheel axles (20L, 20R), said left and right locking members (49L, 49R) being mounted on said control shaft such that said locking members are angularly movable relative to said control shaft by a predetermined amount.

11. The transaxle assembly as set forth in claim 10, wherein said spring means is composed of a torque spring (53) which is disposed on said control shaft (50) and is engaged at its one and the other ends (53a, 53b) to said left and right locking members (49L, 49R), said torque spring being engaged at its axially middle portion (53c) to said control shaft such that each of the axial halves of said spring is torsioned by a rotational displacement of said control shaft so as to provide a lock-operating angular movement to each of said locking members.

12. The transaxle assembly as set forth in claim 8, wherein said axle casing (19) is composed of equally shaped left and right casing halves (19L, 19R) which are fastened together at a plane (S) perpendicular to said left and right wheel axles (20L, 20R) and each of which has a side wall including an aperture (31), said motor means (30) being fixedly mounted on the side wall of one of said casing halves such that said motor shaft (30a) extends into said axle casing through said aperture in said one casing half, said aperture in the side wall of the other casing half being closed by a cover member (68).

13. A transaxle assembly comprising:
an axle casing (19);
a pair of motor means (30L, 30R) fixedly mounted on said axle casing (19), each of said motor means having a motor shaft (30a) which extends into said axle casing;
co-axially disposed left and right wheel axles (20L, 20R) journalled in said axle casing (19);
a pair of speed-reduction mechanisms (40L, 40R) disposed between said motor shafts (30a) of said pair of motor means (30L, 30R) and said left and right wheel axles (20L, 20R), each of said reduction mechanisms including a final reduction wheel (80) fixedly mounted on each of said wheel axles;
lockable left and right rotors (47L, 47R) fixedly mounted on said left and right wheel axles (20L, 20R) in a side-by-side relationship with said reduction wheels (80) of said pair of reduction mechanisms (40L, 40R);

movable left and right locking members (49L, 49R) which are supported within said axle casing (19) and are operable to engage said left and right rotors (47L, 47R) so as to lock said rotors non-rotatably; and a control member (50) disposed within said axle casing (19) and connected operatively to said left and right locking members (49L, 49R) for moving both of said locking members to their lock-operating positions at a same time, one end (50a) of said control member extending outwardly of said axle casing.

14. The transaxle assembly as set forth in claim 13, wherein said control member (50) is connected operatively to said left and right locking members (47L, 47R) through a spring means (53) which is operable to bias said locking members, when said control member is operated, to move toward their lock-operating positions.

15. The transaxle assembly as set forth in claim 14, wherein said control member is composed of a rotatable control shaft (50) which extends parallel to said wheel axles (20L, 20R), said left and right locking members (49L, 49R) being mounted on said control shaft such that said locking members are angularly movable relative to said control shaft by a predetermined amount.

16. The transaxle assembly as set forth in claim 15, wherein said spring means is composed of a torque spring (53) which is disposed on said control shaft (50) and is engaged at its one and the other ends (53a, 53b) to said left and right locking members (49L, 49R), said torque spring being engaged at its axially middle portion (53c) to said control shaft such that each of the axial halves of said spring is torsioned by a rotational displacement of said control shaft so as to provide a lock-operating angular movement to each of said locking members.

17. The transaxle assembly as set forth in claim 13, wherein said axle casing (19) is composed of equally shaped left and right casing halves (19L, 19R) which are fastened together at a plane (S) perpendicular to said left and right wheel axles (20L, 20R) and each of which has a side wall including an aperture (31), said pair of motor means (30L, 30R) being fixedly mounted on the side walls of said casing halves such that said motor shafts (30a) extend into said axle casing through said apertures.

18. A transaxle assembly for self-propelled cleaning machine, which comprises:
an axle casing (19);
input shaft means (30a);
co-axially disposed left and right wheel axles (20L, 20R) which are journalled in said axle casing (19);
transmission means (40; 40L, 40R) disposed within said axle casing (19) and connecting said input shaft means (30a) drivingly to said left and right wheel axles (20L, 20R);
disc-shaped left and right rotors (47L, 47R) which are disposed within said axle casing (19) and are fixedly mounted on said left and right wheel axles (20L, 20R), each of said rotors having at its outer circumference a plurality of teeth (47a);
a rotatable control shaft (50) which is disposed within said axle casing (19) and extends parallel to said wheel axles (20L, 20R), one end (50a) of said control shaft extending outwardly of said axle casing; and left and right locking members (49L, 49R) each of which has at least one pawl (49a) engageable with said teeth (47a) of each of said left and right rotors (47L, 47R) so as to lock said each rotor non-rotatably, said locking members being disposed within said axle casing (19) and being supported by said control shaft (50) such that said locking members are moved rotationally to their lock-operating positions by a rotational displacement of said control shaft.

19. The transaxle assembly as set forth in claim 18, wherein said input shaft means is comprised of a motor shaft (30a) of a motor (30) which is fixedly mounted on said axle casing (19).

20. The transaxle assembly as set forth in claim 18, wherein said input shaft means is comprised of a pair of motor shafts (30a) of a pair of motors (30L, 30R) which are fixedly mounted on said axle casing (19), said pair of motor shafts being connected to said left and right wheel axles (20L, 20R) through a pair of said transmission means (40L, 40R) such that said pair of motors are operable to drive said left and right wheel axles to rotate independently of each other.

* * * * *

UNITED STATES PATENT AND TRADEMARK OFFICE
CERTIFICATE OF CORRECTION

PATENT NO. : 5,386,742
DATED : February 7, 1995
INVENTOR(S) : Koji Irikura et al.

It is certified that error appears in the above-indentified patent and that said Letters Patent is hereby corrected as shown below:

column 2, line 58, delete "particular" and substitute therefor -- particularly shaped --.

column 2, line 59, delete "particular" and substitute therefor -- particularly shaped --.

column 2, line 65, delete "are not" and substitute therefor -- can be in any relationship --.

In claim 5, column 12, line 33, delete "the other end (53c) of it" and substitute therefor -- its middle portion (53c) --.

In claim 20, column 16, line 10, delete "a pair of".

Signed and Sealed this

Thirtieth Day of May, 1995

Attest:

BRUCE LEHMAN

*Attesting Officer*        *Commissioner of Patents and Trademarks*